United States Patent
Peters et al.

(10) Patent No.: US 9,449,613 B2
(45) Date of Patent: Sep. 20, 2016

(54) ROOM IDENTIFICATION USING ACOUSTIC FEATURES IN A RECORDING

(71) Applicant: International Computer Science Institute, Berkeley, CA (US)

(72) Inventors: Nils Peters, San Diego, CA (US); Howard Lei, Alameda, CA (US); Gerald Friedland, El Cerrito, CA (US)

(73) Assignee: AUDEME LLC, Sunnyvale, CA (US)

( * ) Notice: Subject to any disclaimer, the term of this patent is extended or adjusted under 35 U.S.C. 154(b) by 146 days.

(21) Appl. No.: 14/097,369

(22) Filed: Dec. 5, 2013

(65) Prior Publication Data

US 2014/0161270 A1    Jun. 12, 2014

Related U.S. Application Data

(60) Provisional application No. 61/733,942, filed on Dec. 6, 2012.

(51) Int. Cl.
*G10L 25/24*    (2013.01)
*G10L 25/51*    (2013.01)

(52) U.S. Cl.
CPC .............. *G10L 25/24* (2013.01); *G10L 25/51* (2013.01); *G10H 2210/041* (2013.01); *G10H 2210/281* (2013.01); *G10H 2250/311* (2013.01); *G10H 2250/531* (2013.01)

(58) Field of Classification Search
CPC . G10L 25/24; G10L 25/51; G10H 2210/281; G10H 2210/041; G10H 2250/311; G10H 2250/531; H04R 29/00
See application file for complete search history.

(56) References Cited

U.S. PATENT DOCUMENTS

| | | | |
|---|---|---|---|
| 6,760,451 B1 * | 7/2004 | Craven et al. | 381/98 |
| 2006/0126858 A1 * | 6/2006 | Larsen et al. | 381/63 |
| 2007/0237335 A1 * | 10/2007 | O'Sullivan | H04S 7/00 381/63 |
| 2011/0194685 A1 * | 8/2011 | van de Laar | 379/406.01 |
| 2012/0046944 A1 * | 2/2012 | Muhammad | G10L 25/00 704/233 |
| 2012/0093330 A1 * | 4/2012 | Napoletano | 381/63 |

* cited by examiner

*Primary Examiner* — Ping Lee
(74) *Attorney, Agent, or Firm* — Frommer Lawrence & Haug LLP; William S. Frommer

(57) ABSTRACT

Analysis of the audio component in multimedia data is disclosed. Rooms can be described through room impulse responses (RIR), the "fingerprint" of a specific room. The method uses machine learning techniques to identify rooms from ordinary audio recordings.

7 Claims, 9 Drawing Sheets

|          | Bedroom | Church 1 | Church 2 | Clasroom | Great Hall | Studio | Library |
|----------|---------|----------|----------|----------|------------|--------|---------|
| Bedroom  | 0.92    | 0.39     | 0.31     | 0.36     | 0.35       | 0.47   | 0.25    |
| Church 1 | 0.31    | 0.89     | 0.75     | 0.40     | 0.41       | 0.28   | 0.28    |
| Church 2 | 0.27    | 0.81     | 0.88     | 0.34     | 0.38       | 0.28   | 0.35    |
| Clasroom | 0.23    | 0.40     | 0.24     | 0.90     | 0.74       | 0.43   | 0.57    |
| Great Hall | 0.22  | 0.39     | 0.26     | 0.72     | 0.89       | 0.44   | 0.74    |
| Studio   | 0.45    | 0.34     | 0.25     | 0.48     | 0.48       | 0.91   | 0.39    |
| Library  | 0.20    | 0.32     | 0.31     | 0.60     | 0.81       | 0.39   | 0.88    |

Figure 2

ROOM IDENTIFICATION USING ACOUSTIC FEATURES IN A RECORDING

FIELD OF THE INVENTION

The present disclosure is directed to analysis of the audio component in multimedia data and audio-only data. Rooms can be described through room impulse responses (RIR), the acoustic "fingerprint" of a specific room. The disclosed apparatus and method uses machine learning techniques to identify rooms from ordinary audio recordings.

BACKGROUND OF THE INVENTION

Many applications benefit from knowledge about the location of the user, for instance, tagging of uploaded consumer videos based on the geo-location. Because people spend most of their time indoors, it is often desired to also identify the room environment of a user. Under ideal conditions, GPS technology can predict an outdoor geo-location up to a few meters accurately. Inside buildings however, this technology is known to fail. Attempts to additionally use the strength of WiFi signals to gain a better accuracy are known. If WiFi coverage is insufficient, or the capturing device does not support this technology, the indoor location cannot be estimated.

In general, people spend most of their time indoors and, as such, in reverberant environments. For extracting information from a reverberant audio stream, the human auditory system is well adapted. Based on accumulated perceptual experiences in different rooms, a person can often recognize a specific environment just by listening to the audio content of a recording; e.g., a person can distinguish a recording made in a reverberant church from a recording captured in a conference room.

With the emerging trend of location-based multimedia applications, such as automatic tagging of uploaded user videos, knowledge about the room environment is an important source of information. GPS data may only provide a rough location estimate and tends to fail inside buildings. Attempts to use the strength of WiFi signals to gain a better accuracy were presented, e.g., in E. Martin, O. Vinyals, G. Friedland, and R. Bajcsy, "Precise indoor localization using smart phones," In Proceedings of the international conference on Multimedia, pages 787-790. ACM, 2010. However, in these approaches, the location must be estimated and stored as meta data at the time of the capturing process. If either GPS and WiFi coverage is insufficient, or the capturing device does not support location identification technology, the location cannot be estimated. In A. Ulges and C. Schulze. "Scene-based image retrieval by transitive matching", In Proc. of the ICMR, pages 47:1-47:8, Trento, Italy, 2011 ACM, an alternate method predicts common locations by relying on identifying visual similarities (landmarks or similar interior objects). This approach does not account for changes in spatial configurations that may occur, like when new tenants or home owners move furniture or redesign their rooms. In H. Malik and H. Zhao "Recording environment identification using acoustic reverberation", In Proc. of the ICASSP, pages 1833-1836, Kyoto 2012, IEEE, a method is described to estimate the recording environment using a two-fold process; first, a de-reverberation process is applied on an audio recording to estimate the reverberant part from the signal. In other words, the reverberant component has to be filtered out from the audio recording. This process (also known as blind de-reverberation) is computational demanding and may not be suitable for low-power mobile devices such as smart phones, hearing aids, etc. Second, 48 audio features are extracted from the estimated reverberant part and used to train room models using a support vector machine (SVM) learning concept for identifying the acoustic environment. Thus, to identify a recording environment in Malik, the reverberant components within an unknown audio recording have to be estimated first using the blind de-reverberation step. Then, the acoustic features can be extracted and used in the SVM to estimate the recording environment. Malik system was tested only for speech of two people. The present invention is different since it does not do a blind de-reverberation. Instead the present invention extracts acoustic features directly from the audio recording which can be speech or musical signals. Also, the machine learning of the present invention uses a different approach, i.e. Gausian mixture model (GMM)-Universal Background Model (UBM).

SUMMARY

The present invention is directed to analysis of the audio component in multimedia data. This can be complementary to aforementioned methods as shown in H. Lei, J. Choi, and G. Friedland ("Multimodal city-verification on flickr videos using acoustic and textual features", In Proc. of ICASSP, Kyoto, Japan, 2012). Although the specific analysis of acoustical properties to predict the room environment is new, the principles of room acoustics are well understood. Rooms can be described through room impulse responses (RIR), (see ISO 3382-1, "Acoustics—Measurement of room acoustic parameters—Part 1: Performance spaces", International Organization for Standardization (ISO), Geneva, Switzerland, 2009), the "fingerprint" of a specific room. Obtaining RIRs is a time-consuming process and specific measurement signals and equipment are needed (see G. Stan, J. Embrechts, and D. Archambeau, "Comparison of different impulse response measurement techniques", J. Audio Eng. Soc., 50(4):249-262, 2002). Although many applications might benefit from knowledge about the room environment, it is often too complicated or even impossible to conduct such RIR measurements. Therefore, the present invention is directed to using machine learning techniques to identify rooms from ordinary audio recordings.

By using microphone(s) of a mobile device such as camera, mobile phone or hearing aid, the acoustic aspects of the environment are analyzed. Different rooms are known to differ in their acoustic characteristics due to reverberations and background noise. By capturing, audio content, captured by a microphone within different rooms, the audio content is analyzed using machine learning techniques to create models that describe the specific acoustic aspects of the rooms. To estimate the room location from an unknown audio stream, the acoustic features of this unknown audio stream are analyzed and compared with the acoustic features of those previously created room models in order to identify the room.

The system of the present invention is complementary to other location estimation methods e.g., GPS, WiFi localization, or cell tower triangulation. For example, GPS can be use to detect the rough location (e.g., the building) whereas the system of the present invention can identify the specific room location inside this building. Earlier work has showed the feasibility of using multiple-cell phone audio triangulation in combination with WiFi to work. However, the method of the present invention only uses one microphone and does not rely on the presence of any wireless technology, such as GPS or WiFi which may become obsolete and replaced by something else in the future. Earlier work has also shown the feasibility of identifying cities based on audio. The present invention, however, works with much higher granularity since rooms are identified.

BRIEF DESCRIPTION OF THE DRAWING

FIG. 2 shows a confusion matrix of the estimation scores for Experiment C (music).

DETAILED DESCRIPTION OF THE PREFERRED EMBODIMENTS

Figure 1:
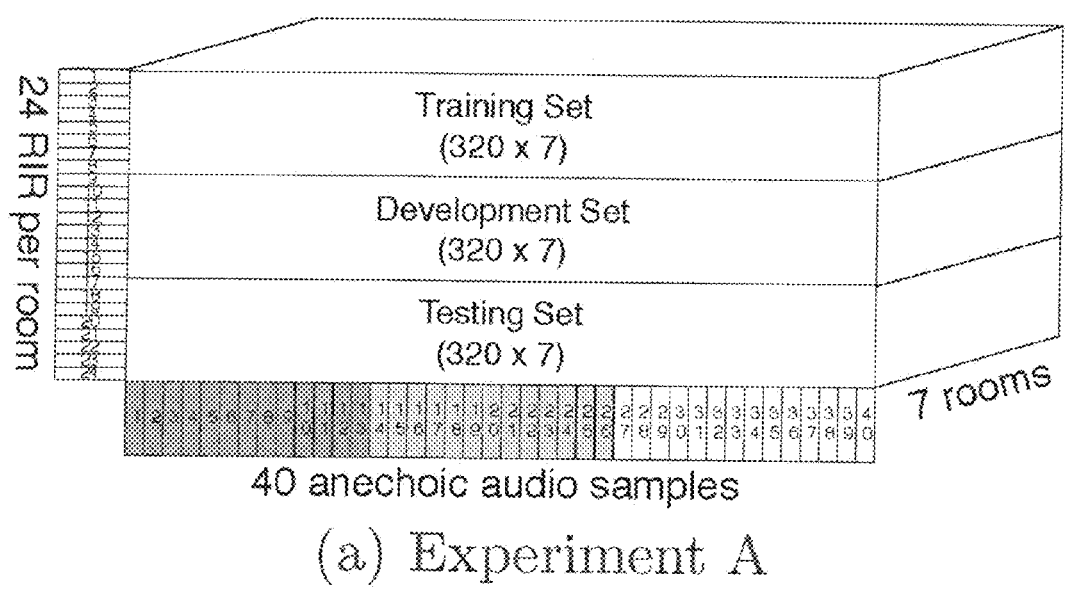
FIGS. 1 (a), (b), (c) shows arrangements of training, development and testing for Experiment A, B, C.
Figure 1:
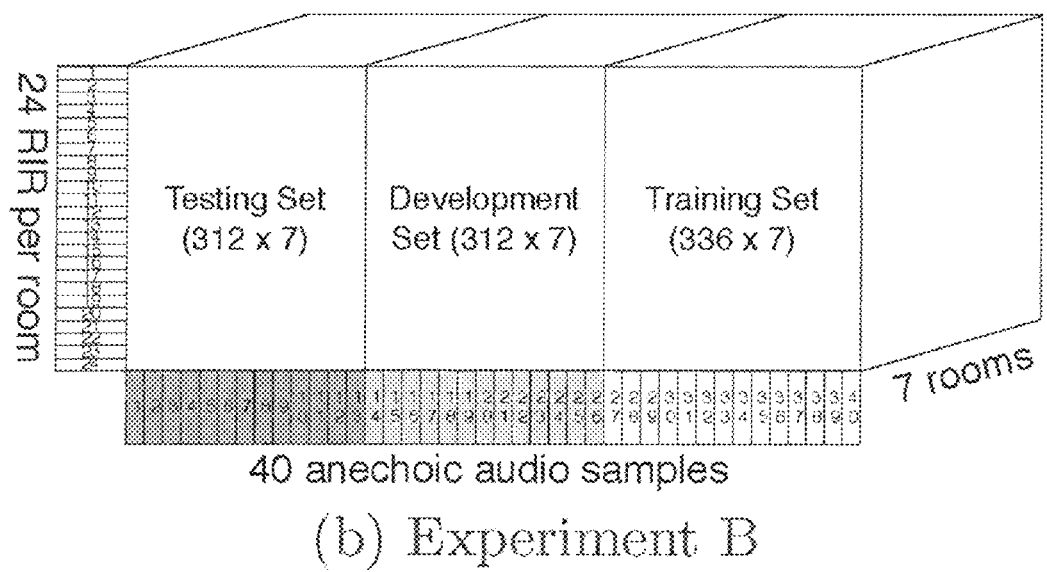
Figure 1:
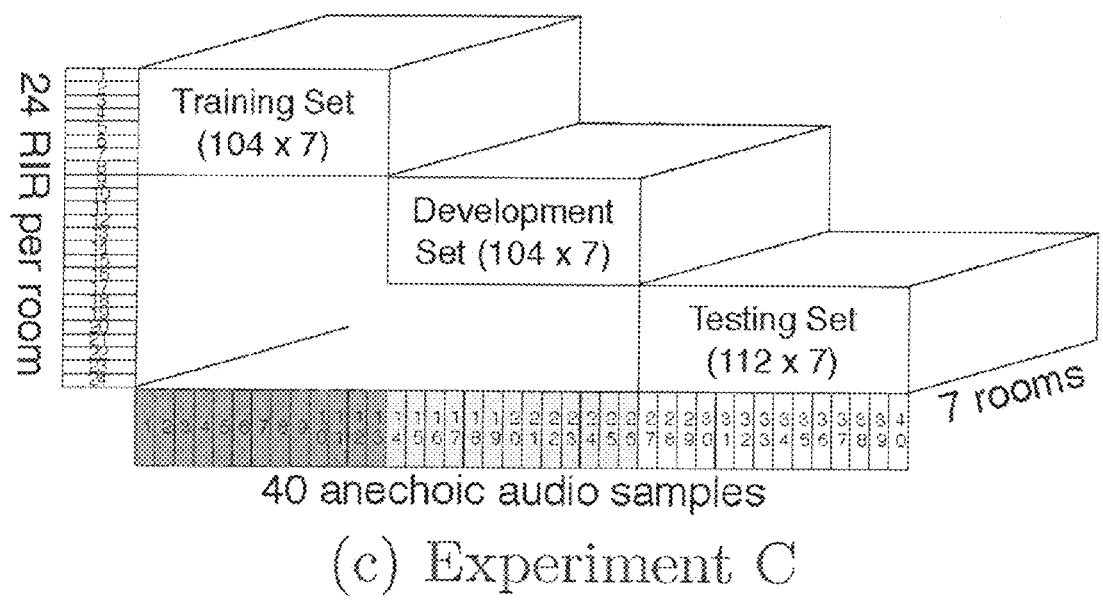

The present invention is directed to identifying a room by its acoustic fingerprint so that an indoor location can be established. In particular, the present invention can obtain an audio signal from a single microphone, such as from a cell phone in an unidentified room. The audio is analyzed to determine how it is affected by the room architecture. Then, the information is compared with previously developed room models, stored in a database, to determine in which room the audio was captured.

First, a set of audio recordings for a predetermined room is obtained, for example, a bedroom, a classroom, a library, etc. Audio features are extracted from each audio signal. The acoustic features that can be extracted are for example Mel-Frequency Cepstral Coefficient (MFCC) (see http://en.wikipedia.org/wiki/mel_frequency_cepstrum) acoustic features as well as other features not limited to MFCC such as modulation spectrogram, etc. The MFCC are audio features that are used for speaker verification or automatic speaker recognition as well as many other applications. The features are frequency dependent so that a plurality of MFCC audio features are extracted for difference frequency ranges. Thus, each audio signal comprises a plurality of individual samples.

The extracted features compress the samples into a smaller number of parameters which are used for room identification. In particular, given a set of extracted audio features for each audio recording in a room, mathematical functions are developed that try to model the distribution of the audio features via machine learning. (see www.dcs.gla.ac.uk/~vinca/textbook.pdf "Machine Learning For Audio, Image and Video Analysis: Theory and Application by Camastra and Vinciarelli for machine learning in an audio domain). In other words, given a set of features extracted from a given room, a set of Gaussian curves, which are standard mean of a normal curve, are developed by computer modeling as a standard model. The set of a plurality of curves are derived for each room to model the distribution of all the features obtained from audio recordings for that particular room. Other machine learning techniques beside a Gaussian mixture mode such an artificial neural network (ANN), etc. may be used.

After a set of room models have been developed by machine learning training, an audio signal of an unknown room is input. The input audio signal, of the unknown room, has its features extracted. Each of the Gaussian curves for the audio signal of the unknown room is compared to the known set of Gaussian curves for each of the model rooms. The comparison that yields the highest match indicates the audio signal is coming from a similar or same room.

The standard model is trained on a variety of rooms that differ in terms of room size and consequently reverberation characteristic. The present system of identifying a specific room can also be used in combination with other systems to identify location such as a GPS. For example, using GPS, height and side of a building could be determined while the room identification system of the present invention uses the room acoustics to determine which room (office, kitchen, bathroom, etc.) the audio is emanating from. Of course, the more audio information that is obtained for a particular room, the more accurate the estimation of the room identity.

Figure 5:
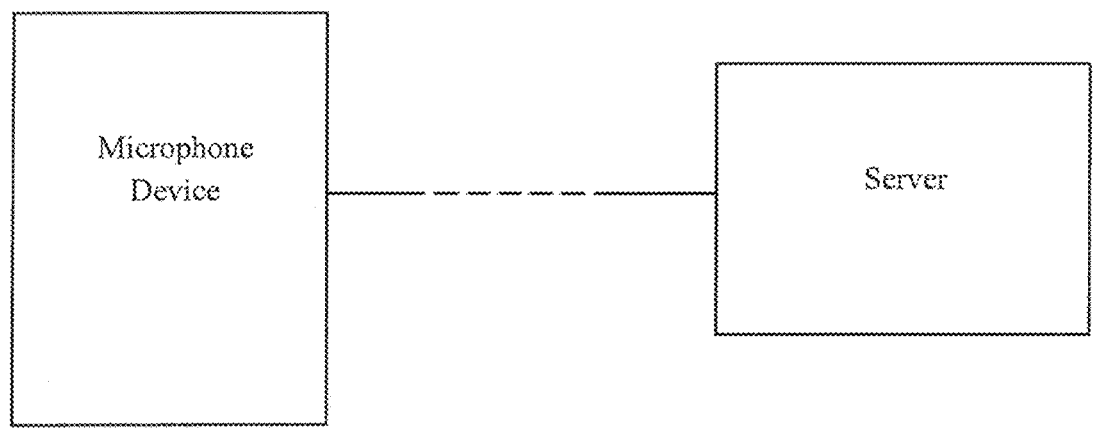
FIG. 5 shows the basic layout of the apparatus.
Figure 7:
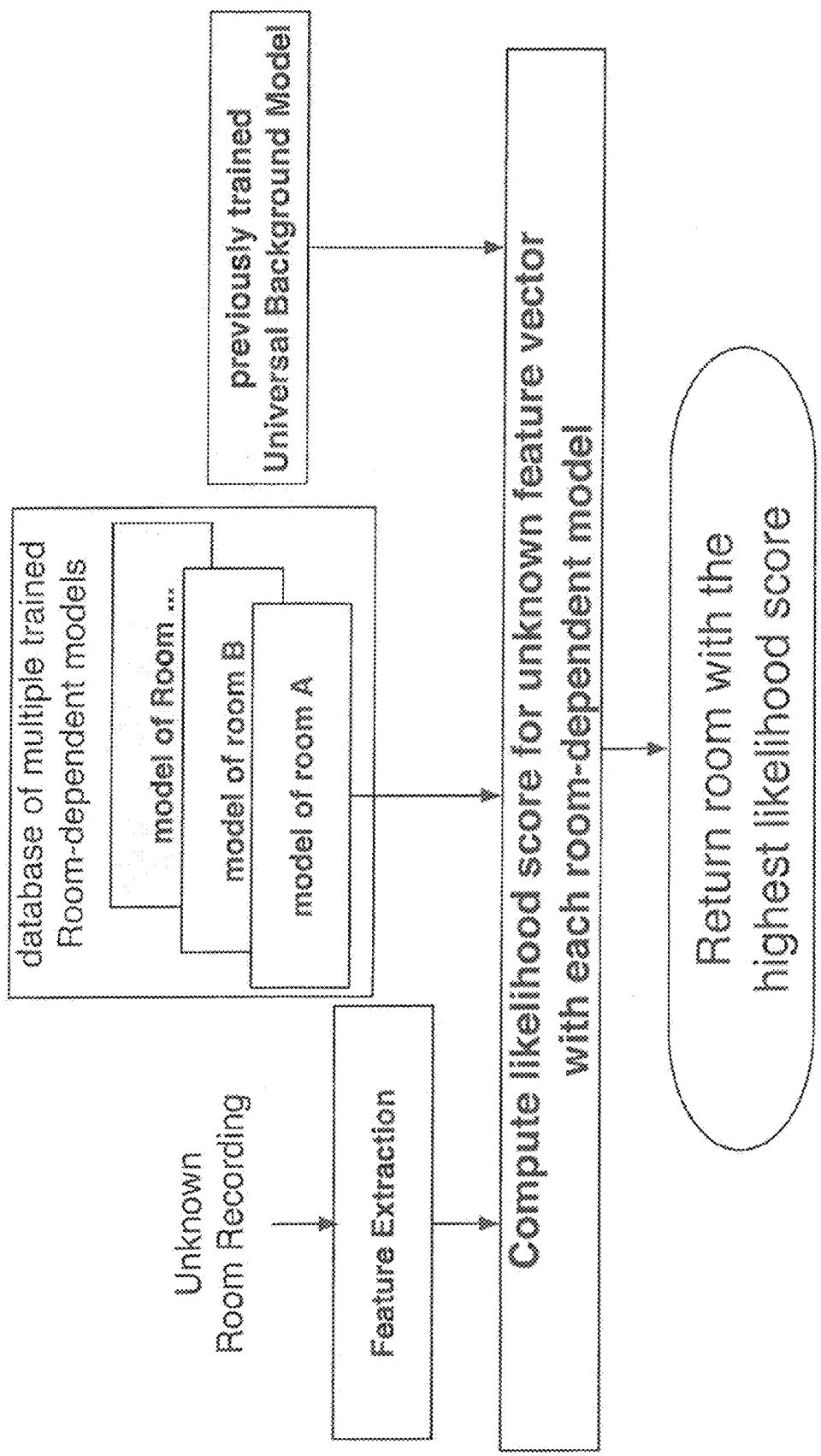
FIG. 7 shows the steps of identifying a room using the preferred embodiment.

As shown in FIG. 5, the audio signal is obtained from a single microphone, such as a cell phone, camera microphone, telephone, PDA, hearing aid, tablet, laptop, watch, consumer electronic device, etc. The audio features can be extracted in the device associated with microphone and transmitted to a data service such as a server. Alternatively, the audio signal is transmitted to the data server and the data service extracts the audio features (MFCC, etc.). An alternative is the data server records the audio signal for later analysis. The data server then compares the extracted audio features of audio signal of the unknown room to the set of room model database stored therein to determine the room identification of the input audio signal. Thus, rooms that have similar audio features can be determined. New models can be added to the database if the algorithm cannot match an unknown recording to a known model. For example, if the likelihood computation, as depicted in FIG. 7, returns a very low likelihood matching score for every room in the database, the system can decide to create a new room model from the acoustic features of the unknown room. The system can store this new room model under a generic ID, or ask a user to provide a name for the new location. GPS location data can be used to create a label for the room. In addition to creating a new room model, the Universal Background Model (UBM) is adapted to account for the new room.

The system is derived from a GMM-based (Gaussian mixture model) system using Mel-Frequency Cepstral Coefficient (MFCC) acoustic features, which have proven to be effective in related audio-based tasks such as speaker recognition. For each audio recording in a specific room, one room-dependent GMM is trained using MFCC features from all audio recordings associated with that room. This is done via MAP (maximum a posteriori probability) adaptation from a room-independent GMM, trained using MFCC features from all audio tracks of all rooms in the development set. For the room identification of an unknown audio stream, the likelihood of MFCC features from the test audio tracks are computed using the room-dependent GMMs of each room in the training set. The likelihood values for which the room of the test audio matches the room of the GMM model are known as the true scores. The room model with the highest score represent the estimated room.

Figure 6:
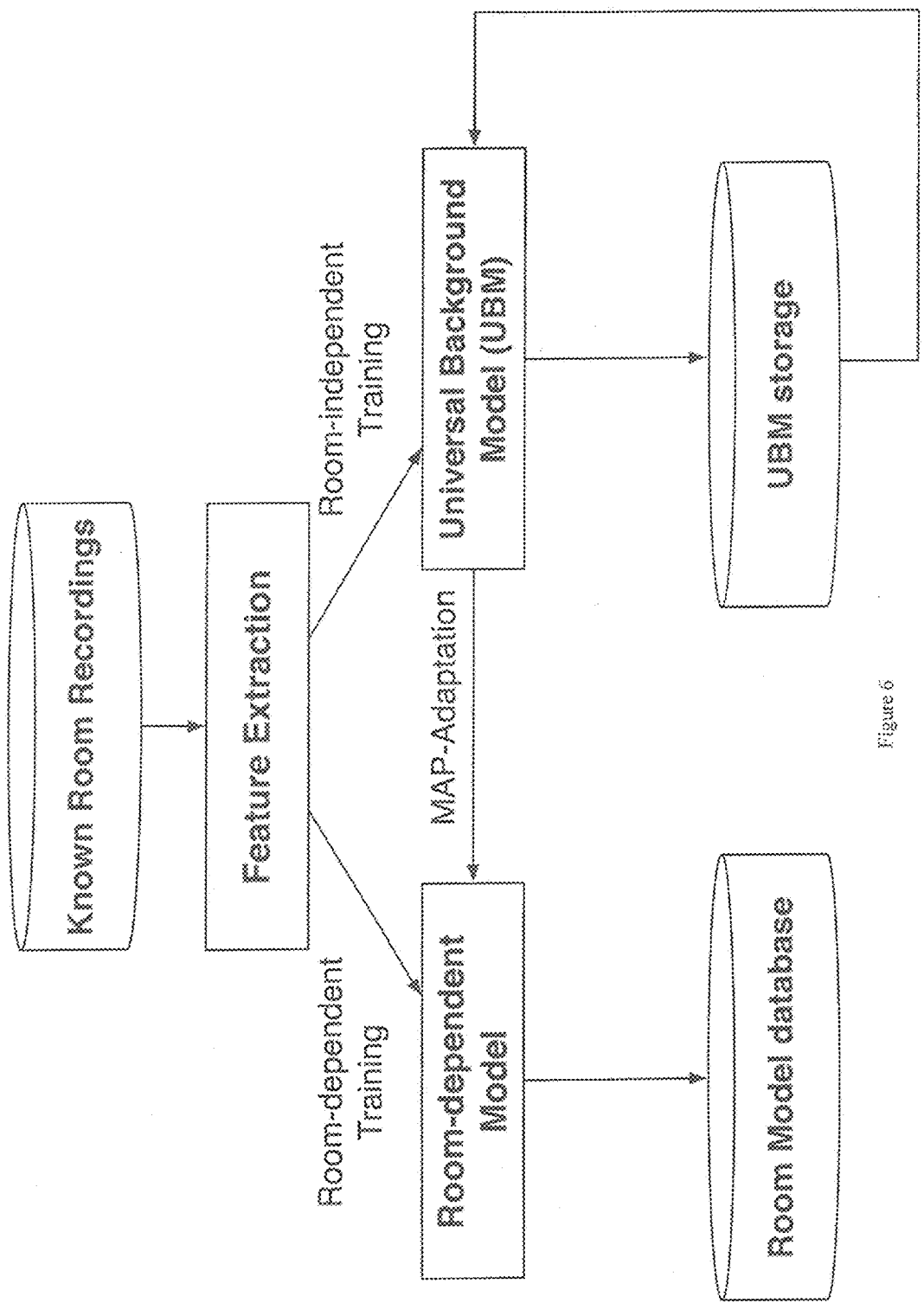
FIG. 6 shows the steps of creating room models with the preferred embodiment.

As shown in FIG. 6, first a database of model rooms is created. This is done by obtaining at least one and preferably several audio data for each type of room, such as a living room, class room, etc. The acoustic characteristic of the rooms will differ for instance due to room size, room shape, absorptive characteristic of surface materials or furnishings within the rooms so that reverberation will be different per room. The audio data for each room is analyzed to obtain audio features. A room fingerprint is generated for each room via machine learning. Each room fingerprint is then stored in a database.

As shown in FIG. 7, an audio signal from an unknown room is input. The audio signal of the unknown room is analyzed to obtain audio features. The obtained audio features of the unknown room are modeled into a set of Gaussian curves which are then compared to each room in the database to determine how similar the unknown room is to rooms in the database. A threshold can be set to determine if there is a match. If the fingerprint of the unknown room is greater than the threshold, then a match is determined and the room is similar. If not, then the room is rejected. Also, if the room fingerprint matches too many fingerprints in the database, the unknown room is rejected.

Because no standardized dataset exists for the task of room identification, to test the invention a corpus was generated from anechoic audio recordings, each filtered with a variety of impulse responses from a number of rooms. To allow reproducibility of the results, publicly available anechoic audio recordings and RIRs datasets were intentionally used. One requirement in creating the corpus was that only RIRs from real rooms were included, i.e., they are not synthesized using room acoustic modeling software or artificial reverberators. Another challenging requirement was to find publicly available RIR datasets that measured multiple RIRs in a room. This is crucial to generalize the experimental results: an RIR depends on the location of sender and receiver, therefore no RIR within a room is completely similar to another. The final set of RIRs are collected from the databases (1) Mardy database: http://www.commsp.ee.ic.ac.uk/~sap/uploads/data/MARDY.rar, (2) http://www.1-1-1-1.net, http://www.openairlib.net and (3) R. Stewart and M. Sandler, "Database of omnidirectional and B-format impulse responses", In Proc. of ICASSP, Dallas, USA, 2010. The databases comprise seven rooms. For each selected room, 24 RIRs are available. Table 1 summarizes several objective RIR measures (see H. Kuttruff, "Room Acoustics", Spon Press, London, UK, 2009) and their variation across the 24 RIRs per room.

A Gaussian mixture model (GMM) approach (see N. Shabtai, B. Rafaely, and Y. Zigel. Room "Volume classification from reverberant speech", In Proc. of int'l Workshop on Acoustics Signal Enhancement, Tel Aviv, Israel, 2010) estimated the room volume in reverberant speech recordings into six room classes, ranging from 40 $m^3$ to 18000 $m^3$. From the four tested feature extraction approaches, the best results were achieved by computing RIR features from an estimated RIR derived from abrupt stops in speech signals with an equal error rate or (EER) 22%. The worst EER (30%) was achieved by using Mel-Frequency Cepstral Coefficient (MFCC) features extracted from reverberant speech. In the latter, 12 MFCCs and their deltas were extracted using a 1 sec. Hamming window. In N. D. Gaubitch, H. W. Löllmann, M. Jeub, T. H. Falk, P. A. Naylor, P. Vary, and M. Brookes. "Performance comparison of algorithms for blind reverberation time estimation for speech", In Proc. of int'l Workshop on Acoustics Signal Enhancement, Aachen, Germany, 2012 three different methods to estimate the reverberation time $T_{60}$ from reverberated speech were compared. These methods are based on the Modulation Energy Ratio, Spectral Decay Distribution, and on a maximum likelihood of a statistical model of the sound decay. In low noise conditions the latter two methods were found to provide accurate estimation to within ±0.2 sec for $T_{60} \leq 0.8$ sec. Currently, there are no studies for room classification using musical material.

The anechoic musical recordings for the corpus were taken from (1) http://www.openairlib.net, (2) Bang & Olufsen, "Music for Archimedes", Audio CD and (3) Denon, "Anechoic orchestral music recording", Audio CD, 1995. The recordings of Denon captured multiple instruments within a recording, whereas the rest of the anechoic audio files contain single instruments, e.g., trumpet, guitar, or a clarinet. The sample length was limited to 30 seconds. Forty anechoic speech recordings were taken from the EMIME speech corpus (1) http://www.emime.org/participate/emime-bilingual-database and from (2) Bang & Olufsen, "Music for Archimedes", Audio CD and comprise 20 dif-

TABLE 1

Standard Acoustical Measures of the different rooms used for creating the corpus.
The data shows average μ and standard deviation σ across the 24 RIRs per room.

| Room + Reference | Vol [m³] | EDT(A) [sec] | | T₃₀ [sec] | | ITDG [ms] | | CT [ms] | | BR | |
|---|---|---|---|---|---|---|---|---|---|---|---|
| | | μ | σ | μ | Σ | μ | Σ | μ | σ | μ | σ |
| Bedroom | 25 | 0.255 | 0.040 | 0.278 | 0.010 | 1.500 | 0.751 | 13.269 | 4.811 | 1.391 | 0.546 |
| Studio | 150 | 0.530 | 0.163 | 0.670 | 0.021 | 1.652 | 0.758 | 7.937 | 4.217 | 3.288 | 0.548 |
| Classroom | 236 | 3.766 | 0.039 | 6.649 | 1.865 | 4.888 | 4.180 | 89.137 | 26.221 | 1.292 | 1.031 |
| Church 1 | 3600 | 2.512 | 0.108 | 3.152 | 0.071 | 6.999 | 6.898 | 58.612 | 16.713 | 0.898 | 0.136 |
| Church 2 | 3600 | 3.264 | 0.116 | 3.645 | 0.046 | 9.754 | 8.616 | 72.905 | 20.403 | 0.895 | 0.148 |
| Great Hall | unreported | 4.059 | 0.187 | 5.395 | 2.503 | 3.075 | 1.944 | 59.029 | 17.662 | 1.337 | 0.787 |
| Library | 9500 | 5.533 | 0.177 | 6.258 | 1.544 | 6.738 | 13.292 | 87.513 | 29.470 | 1.318 | 1.419 |

EDT(A): A-weighted Early Decay Time of reverberation of the audio signal; ITDG: Initial Time Delay Gap (i.e. time gap between the arrival of the direct sound and the first sound reflected from the surfaces of the room); CT: Center Time; BR: Bass Ratio.

Particularly interesting and potentially challenging for our approach, the datasets of Church 1 and Church 2 have been captured in the same room (St. Margaret's Church in York (see http://www.openairlib.net), each with a different acoustical configuration. Thus they are considered as two different rooms. For Church 1, drapes and panels have been used to make this room suitable for lectures and speech; for Church 2, panels were removed to create a more reverberant space suitable for music recitals.

ferent male and 20 female speaker samples of 20 seconds. All anechoic samples are musically or lexically unique within the dataset.

In total, 80 anechoic audio files and 168 RIRs are used to generate 13440 reverberant audio samples in 16 bit and 44.1 kHz. The total size of the corpus is 30 GB.

The present invention room identification system is derived from a GMM-based system using Mel-Frequency Cepstral Coefficient (MFCC) acoustic features. The MFCC acoustic features have proven to be effective in related audio-based tasks such as acoustic event detection (see R. Mertens, H. Lei, L. Gottlieb, and G. Friedland, "Acoustic super models for large scale video event detection", In Proc. of ACM Multimedia Workshop on Social Media, Arizona, USA, 2011), location identification (see H. Lei, J. Choi, and G. Friedland, "Multimodal city-verification on flicker videos using acoustic and textual features", In Proc. of ICASSP, Kyoto, Japan, 2012), and speaker recognition (see D. Reynolds, T. Quatieri, and R. Dunn, "Speaker verification using adapted Gaussian mixture models", Digital signal processing, 10(1-3):19-41, 2000). In the present invention, MFCC filter features C0-C19 (with 25 ms window lengths and 10 ms frame intervals), along with deltas and double-deltas (also known as differential and acceleration coefficients) (60 dimensions total), are extracted from the single input audio with an upper frequency limit of 15 kHz using HTK (tool kit for building hidden Markov models and primarily designed for speech recognition) (see S. Young et al., "The HMM toolkit" (HTK), 1995). For each audio recording, one room-dependent Gaussian mixture model (GMM) is trained for each room using MFCC features from all audio recordings associated with that room. This is done via MAP (maximum a posteriori probability) adaptation from a room-independent GMM, trained using MFCC features from all audio recordings of all rooms in the development set. During testing, the likelihood of MFCC features from the test audio tracks are computed using the room-dependent GMMs of each room in the training set. A total of 128 mixtures and simplified factor analysis (see P. Kenny and P. Dumouchel, "Experiments in speaker verification using factor analysis likelihood ratios," In Proc. of Odyssey, 2004) are used for each GMM. The open-source ALIZE toolkit is employed for the GMM and factor analysis implementations (see J. Bonastre, F. Wils, and S. Meignier, "ALIZE, a free toolkit for speaker recognition", In Proc. of ICASSP, volume 1, pages 737-740. IEEE, 2005).

The likelihood values that the room of the test audio matches the room of the GMM model are known as the true scores; values for which the rooms do not match are known as the impostor scores. The system performance is based on the equal error rate (EER), which occurs at a scoring threshold where the percentage of impostor scores above the threshold equals the percentage of true scores below it. The lower the EER, the higher the accuracy of the system.

Four different sets of experiments were carried out to understand the performance of our room identification system and to explore potential challenges. The first three groups of experiments explore the system's performance by using fundamentally different sets of training (i.e. audio data used to train system/model) testing (i.e. audio data used to test the trained system/model), and development sets (i.e. audio data not used to train or test system/model). All experiments are carried out using 3-fold cross validation and the averaged equal error rate (EER) is reported. All experiments are first carried out by separately testing the Music samples and Speech samples of the corpus (i.e. dataset generated from anechoic audio recordings). For the Combined setting, the entire corpus is used.

Experiment A

In this experiment, the reverberant audio files of the training sets, development sets, and testing sets are based on common anechoic audio samples. As depicted in FIG. 1(a), the difference between the datasets are the different RIRs (i.e. room impulse responses) within a room the anechoic audio samples were filtered with. In total each of the three datasets comprises 320 audio samples for each of the seven rooms, resulting in 2240 audio samples per set.

Experiment B

Here, the datasets are created in opposition to Experiment A. Now the training set, development set, and testing set are created based on the same RIRs. The difference across the sets is in the anechoic audio files (FIG. 1(b). Compared to Experiment A, this experiment is potentially more challenging, because the training is based on completely different anechoic audio files than the model was trained on.

Experiment C

The three datasets are based on different anechoic audio samples as well as different RIRs per room. As can be seen in FIG. 1(c), they have no common audio data. This scenario is closest to reality where the system estimates the room based on a completely unknown audio recording.

Table 2 summarizes the averaged equal error rates (EER) for all three experiments with the different content condition music, speech, and combined. All results are the averaged EER of a 3-fold cross validation. Three observations can be made. Compared to the musical material, the EER of the speech content in all experiments is about twice as good. The EER of the combined condition, where testing and training datasets contained both music and speech content, is about the average of the EER for music and speech in separation. Second, the EER of Experiment C is about twice as high compared to those of Experiment A and Experiment B. Experiment A and Experiment B resulted on average in a similar EER. However, for Experiment B, where the training, development, and testing datasets differ with respect to the audio content, the variance of the EER across the three different rounds in the cross validation is considerably better than those for Experiment A.

All experiments were also carried out using the limited feature set of pure MFCC, and MFCC+Δ. These results are not shown since they achieved a higher EER.

TABLE 2

Resulting equal error rates (EER)

| Experiment | Music | Speech | Combined |
| --- | --- | --- | --- |
| Experiment A | 15.07 | 8.57 | 13.23 |
| Experiment B | 14.71 | 7.67 | 11.28 |
| Experiment C | 32.36 | 15.14 | 23.85 |

FIG. 2 shows the confusion matrix of the normalized estimation scores of the testing data in Experiment C (music)—the experiment with the highest EER and an accuracy of 61%. For speech signals, the accuracy was 85% (not shown here). A confusion matrix is a table layout that visually shows the performance of the model. The confusion matrix clearly shows that the room identification system is able to relate audio data to the correct room. One can also see that the models identification of the correct room (i.e. estimation error) is not randomly distributed. Rather it depends on the (acoustical) similarities of the tested rooms. For instance, there is high confusion between the audio data associated with Church 1 and Church 2 (i.e. church 1 to church 2 ERR of 0.75 and church 2 to church 1 ERR of 0.81). Contrarily, Bedroom and Studio are least prone to confusion (i.e. Bedroom to Studio ERR of 0.47 and Studio to Bedroom ERR of 0.45).

Figure 3:
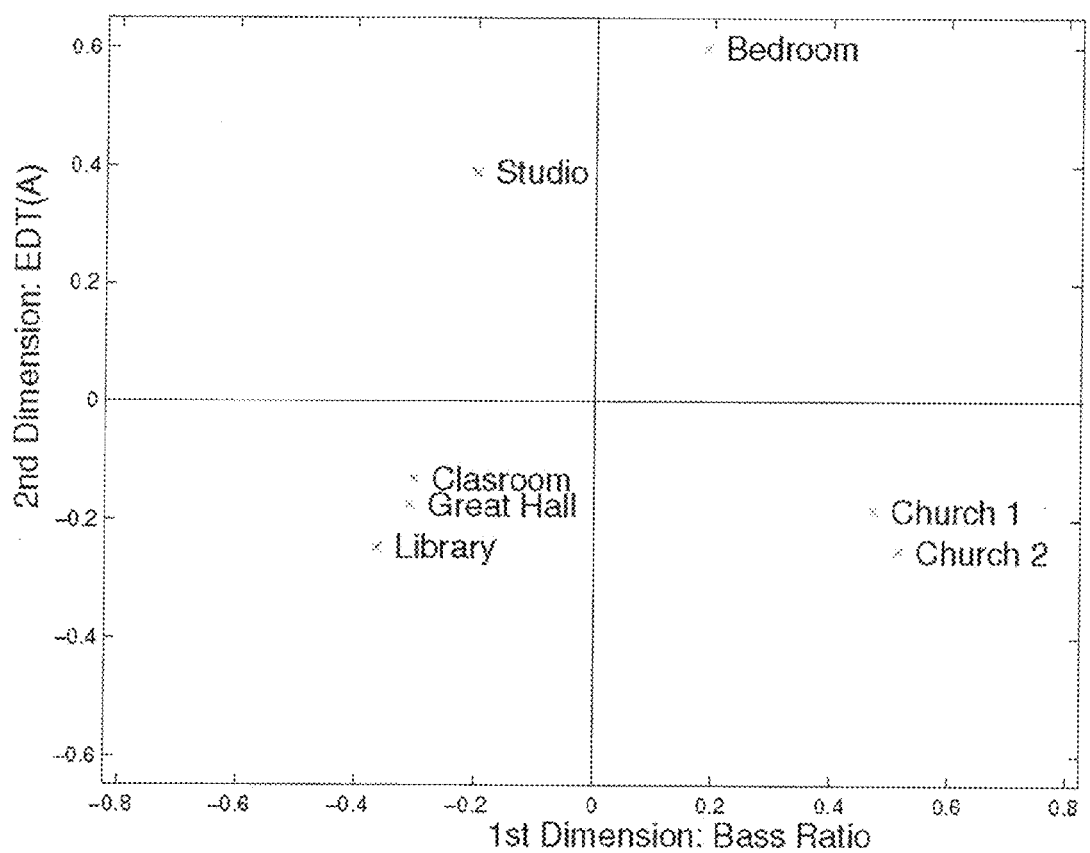
FIG. 3 shows MDS (multidimensional scaling) analysis of data shown in FIG. 2.

Non-parametric multidimensional scaling (MDS) was performed on the confusion data. MDS is a technique where dissimilarities of data points are modeled as distances in a low-dimensional space. A large dissimilarity is represented by a large distance and vice versa. The first two dimensions of the MDS are plotted in FIG. 3. FIG. 3 clearly shows the ability of the system to separate the different rooms based on where the different rooms are plotted on graph. Using rank correlation, we found that the first MDS dimension is well correlated with the Bass Ratio (BR) feature ($\rho(6)=-0.79$), which is the ratio of the low-frequency reverb time compared to the mid-frequency reverb time. The second MDS dimension is correlated with the A-weighted Early Decay Time (EDT(A)) of the RIRs ($\rho(6)=-1.0$). The EDT is based on the time in which the first 10 dB decay of the reverb occurs and is closely related to the perceived reverberance (see H. Kuttruff, "Room Acoustics", Spon Press, London, UK, 2009). The MDS organizes the seven tested rooms into four clusters (see FIG. 3).

The most prominent parameter that can influence the feature extraction process and eventually the resulting EER is the MFCC window size. Speech recognition applications historically use a window size of 25 ms. In contrast, J. Bonastre, F. Wils, and S. Meignier. ALIZE, "free toolkit for speaker recognition", In Proc. of ICASSP, volume 1, pages 737-740. IEEE, 2005 applied a 1 sec MFCC window size.

Figure 4:
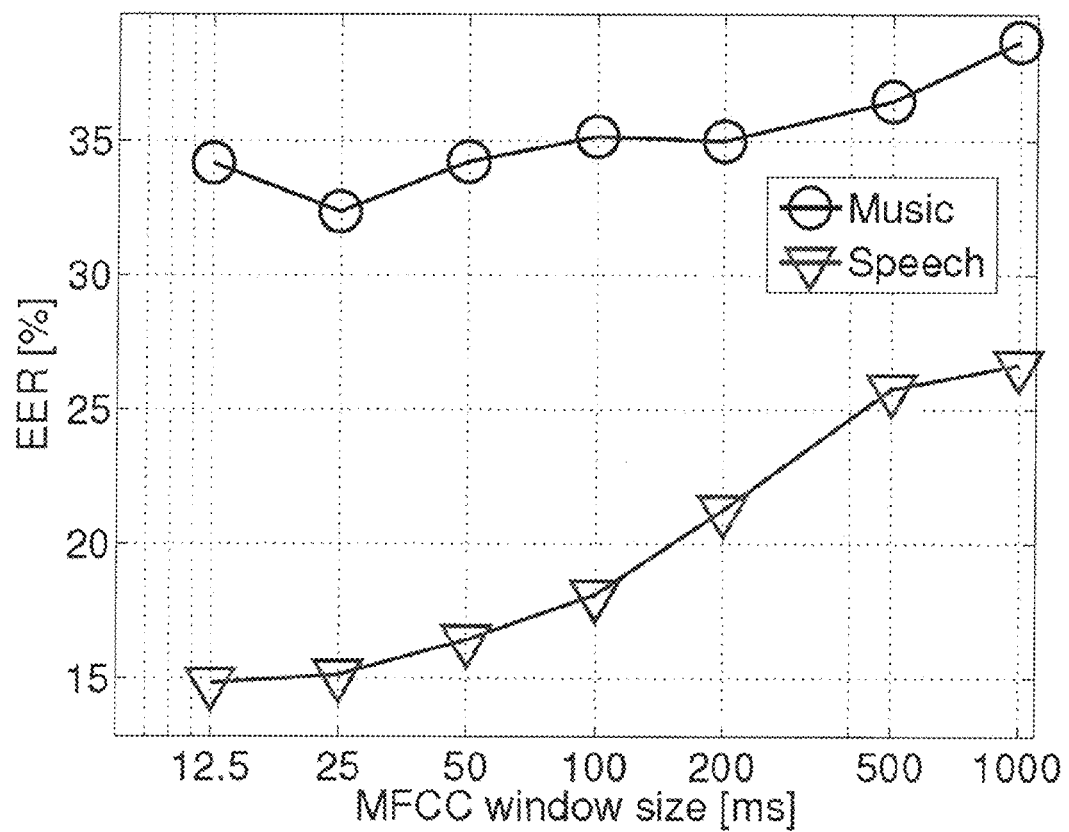
FIG. 4 shows the effect of MFCC (Mel-Frequency Cepstral Coefficient) window size on the EER (equal error rate).

Using the design of Experiment C and by varying the MFCC window size from 12.5 ms to 1 sec, the effect on the EER was measured. FIG. 4 shows that a larger window size leads to a higher EER. On average, the lowest EER was achieved with a size of 25 ms. This finding suggests that for room identification short-term MFCC features are more suitable than-long term MFCC features.

The present invention as discussed above is a system for identifying the room in an audio or video recording based on MFCC-related acoustical features. Using a 30 GB corpus with more than 13000 reverberant audio samples from seven different rooms, this GMM-based system was tested under various conditions. With no common audio data between the training and testing data, the system achieved overall accuracy of 61% for music and 85% for speech signals. Moreover, with common content between the training and testing data, the error is halved. These results show the feasibility of using implicit audio cues for identifying the acoustical environment in a video or audio recording. To potentially improve the accuracy for music content, additional features such as those based on the modulation spectrogram can be used. Large scale real-world audio and video datasets from Flickr and YouTube can be used to train the system for identifying concert venues and other indoor environments.

Besides location estimation, many other applications can benefit from knowledge about the acoustical environment. For instance automated speech recognition systems, known to be easily affected by unknown room reverberance, could adapt the recognition engine based on the identified room acoustic environment. A music recommendation system could automatically create a playlist of recordings made in a specific concert venue. In an emergency response system, the room acoustics within an emergency phone call may give additional cues beneficial for the rescue, or even expose a fake emergency call. The latter example points to law-enforcement and forensic applications.

The embodiments of the present invention are described above. However, the present invention is not limited to the particular embodiments. Various changes and modifications can be made without departing from the spirit and scope of the present invention.

What is claimed is:

1. A method of identifying a room comprising the steps of:
   storing a database of a plurality of acoustic models for a plurality of identified rooms;
   inputting audio data from at least one microphone in an unknown room;
   extracting Mel-Frequency Cepstral Coefficient audio features from the input audio data;
   using machine learning to create a set of a plurality of parameters of functions as an acoustic model of the unknown room based upon the extracted Mel-Frequency Cepstral Coefficient audio features;
   comparing the acoustic model of the unknown room to the plurality of acoustic models in the database to determine a likelihood score that the model of the unknown room compares to respective ones of the acoustic models;
   determining the highest likelihood score of the unknown room to at least one of the acoustic models in the database;
   identifying the acoustic model of the unknown room as similar to the room in the database based on the likelihood score of the unknown room; and
   outputting the identity of the unknown room.

2. A method, of identifying a room comprising the steps of:
   storing a database of a plurality of acoustic models for a plurality of identified rooms;
   inputting audio data from at least one microphone in an unknown room;
   extracting audio features from the input audio data;
   using machine learning to create a set of a plurality of parameters of functions as an acoustic model of the unknown room based upon the extracted audio features, wherein the acoustic model is a Gaussian mixture model;
   comparing the Gaussian mixture acoustic model of the unknown room to the plurality of acoustic models in the database to determine a likelihood score that the model of the unknown room compares to respective ones of the acoustic models;
   determining the highest likelihood score of the unknown room to at least one of the acoustic models in the database;
   identifying the Gaussian mixture acoustic model of the unknown room as similar to the room in the database based on the likelihood score of the unknown room; and
   outputting the identity of the unknown room.

3. The method according to claim 1 or 2, wherein the microphone is provided in a mobile device.

4. The method according to claim 3, wherein the mobile device is one of a telephone, PDA, cell phone, camera and hearing aid.

5. The method according to claim 3, further comprising the step of determining a location of the mobile device using one of WiFi and GPS.

6. The method according to claim 1 or 2, wherein if no match is determined, output a result that the unknown room is not one of the rooms in the database.

7. The method according to claim 1 or 2, wherein the set of the plurality of parameters of functions created by machine learning include a plurality of curves.

* * * * *